United States Patent [19] [11] Patent Number: 4,918,558
Igarashi et al. [45] Date of Patent: Apr. 17, 1990

[54] MAGNETIC TAPE CASSETTE HAVING REEL LOCKS CONTROLLED BY AN OPTICAL TAPE END DETECTING ELEMENT

[75] Inventors: Tadao Igarashi; Takashi Ota, both of Miyagi; Takeo Oba, Kanagawa, all of Japan

[73] Assignee: Sony Corporation, Tokyo, Japan

[21] Appl. No.: 287,155

[22] Filed: Dec. 21, 1988

[30] Foreign Application Priority Data

Dec. 22, 1987 [JP] Japan .................. 62-324526

[51] Int. Cl.⁴ ............................................. G11B 23/02
[52] U.S. Cl. ................................... 360/132; 242/198; 242/199
[58] Field of Search ............... 360/132, 74.6; 242/198, 242/199

[56] References Cited

U.S. PATENT DOCUMENTS 4,447,020  5/1984  Toi et al. ............................ 242/198
4,496,118  1/1985  Oishi et al. ..................... 360/132 X
4,683,511  7/1987  Kara .................................... 360/132

Primary Examiner—Robert S. Tupper
Assistant Examiner—Andrew L. Sniezek
Attorney, Agent, or Firm—Lewis H. Eslinger; Jay H. Maioli

[57] ABSTRACT

A magnetic tape cassette comprises a compact reel lock mechanism which includes a pair of reel lock arms engaging with outer peripheries of a pair of tape reels, a sliding member serving as a cover for a single opening through which an end of an optical tape end detecting element is inserted into the cassette casing, a cam member which provided on the sliding member for rotating the pair of reel lock arms, and a guide member guiding said sliding member. When the tape cassette is out of a recording and/or reproducing apparatus, the single opening is closed by the sliding member and the reel lock arms restrict rotation of reels. Conversely, when the tape cassette is inserted into the recording and/or reproducing apparatus, the sliding member is pushed up by the end of the optical detecting element and as a result the cam member moves upward along with said sliding member. The opening, therefore, becomes open, and simultaneously the cam member releases engagement between the reel lock arms and the peripheries of tape reels.

8 Claims, 4 Drawing Sheets

MAGNETIC TAPE CASSETTE HAVING REEL LOCKS CONTROLLED BY AN OPTICAL TAPE END DETECTING ELEMENT

BACKGROUND OF THE INVENTION

1. Field of the Invention

The present invention relates generally to a magnetic tape cassette, particularly to a magnetic tape cassette comprising a pair of tape reels each having a pair of reel flanges, a magnetic tape cassette casing formed of upper and lower halfs, and a pair of reel lock arms provided within the casing so as to restrict rotation of the pair of reels, when the tape cassette is out of a recording and-/or reproducing apparatus.

2. Description of the Prior Art

Magnetic tape cassettes comprising two magnetic tape reels and a magnetic casing are common.

Recently, there have been proposed and developed magnetic tape cassettes provided with an opening for receiving an optical tape end detector, which detects the beginning of the tape and the end of tape and which is provided in a recording and/or reproducing apparatus, and a tape reel locking mechanism which restricts rotation of a pair of tape reels when the cassette is not in the apparatus and is released so as to allow the smooth rotation of the tape reels when the cassette is in use. Such a prior art VTR tape cassette is shown in FIGS. 1 and 2.

As shown in FIG. 1, the lower half of the casing 1 is provided with an opening 2 for receiving a lock releasing pin which is capable of releasing the engagement between a pair of tape reels 6 and a pair of reel lock arms 5 and which is provided in the recording and/or reproducing apparatus. The lower half of the casing is also provided with a detector opening 3 through which a light source portion of a tape end detector of the apparatus is inserted into the tape cassette. As best shown in FIG. 1, the pair of reel lock arms 5 each comprises an engaging portion 7 for engaging with grooves 12 which are formed between teeth on an outer periphery of a flange of a tape reel 6, a substantially L-shaped portion having a circular cross-section pin 8, and a cylindrical portion 9 pivotably supported by a pin 10 provided on the lower half of the casing. The engaging portion 7 is normally biased by the spring force of a spring 11 into engagement with the grooves 12. The pair of reel lock arms 5 are rotated by a lock releasing member 4 having a pushing portion 4a for pushing the pin 8, a lid portion 4b for covering the opening 2, and a shaft 4c rotatably supported by a cylindrical supporting member 16 horizontally provided on the lower housing 1, when the lock releasing pin is inserted into the opening 2. The releasing operation of the reel lock arms 5 will be hereinbelow described.

As seen clearly in FIG. 2, the lock releasing member 4 is urged by the lock releasing pin 17 to rotate about its shaft 4c and as a result the pushing portion 4a pushes the pair of pins 8, thereby rotating the reel lock arms out of engagement with the grooves 12 and thus the pair of reels become free to rotate.

As set forth above, such VTR tape cassettes require two openings, namely, the first opening 2 for receiving the lock releasing pin 17 and a second opening 3 for receiving the optical tape end detector. The first opening 2 is covered by a lid portion 4b, but the second opening 3 remains open and as a result dust tends to get into the cassette casing. Furthermore, it may be conceived that the tape end detector could double as the lock releasing pin. However, the distance that the light source portion projects into the cassette casing is larger than the corresponding projection distance of the lock releasing pin, even though the lock releasing member 4 is rotated, the large amount of rotation of the lock releasing member 4 necessary to permit operation as the tape end detector is impossible because the internal space of the cassette casing is limited.

A magnetic tape cassette with a reel lock mechanism, in which a single opening receives a tape end detector which also functions to release the reel locking mechanism, has been disclosed in the Japanese Patent First Publication (Jikkai Showa) 58-109873. In such a magnetic tape cassette, a reel lock arm is moved by a cam surface which is formed on the top end of the tape end detector and which is conical. However, in this construction, the amount of movement of the reel lock arm is proportional to the diameter of the top end. Therefore, when the desired amount of the movement is required, a relatively large diameter conical cam portion is required. As a result, the size of the reel lock mechanism is increased. Furthermore, with this construction the problem remains that there is a hole in the casing through which dust can enter.

SUMMARY OF THE INVENTION

Therefore, it is an object of the invention to provide a magnetic tape cassette having a single opening and a lid member which serves for covering it, through which a tape end detecting member can be inserted so as to serve an additional function as a lock release for releasing engagement between a pawl portion of a reel lock arm and a set of teeth formed on a periphery of a flange of the tape reel.

Another object of the invention is to provide a magnetic tape cassette in which dust cannot be introduced through an opening of in the cassette casing.

A further object of the invention is to provide a magnetic tape cassette having a compact reel lock mechanism.

In order to accomplish the aforementioned and other objects, a magnetic tape cassette according to the present invention, comprises a pair of tape reels each being rotatable about its axis for receiving a tape, a housing defining a space for enclosing the reel, a pair of reel lock arms pivotably provided in the housing which engage with the peripheries of the reels for restricting rotation of the reels, a first spring release for establishing engagement between the reel lock arms and the peripheries of the reels, an opening formed in the bottom face of the housing for receiving a tape end detecting element having a light source, a sliding member capable of sliding along a predetermined path for covering the opening, a pair of cam members provided on the sliding member for rotating the reel lock arms so as to release engagement between the reel lock arms and the peripheries of the reels when the tape end detecting element is inserted into the opening, a guide member for defining the predetermined path of the sliding member and defining a space through which light from the detecting element passes along a predetermined optical path, and a second spring element for biasing the sliding member towards a bottom position in which the opening is closed by the sliding member.

The second spring element is comprised of a coil spring and is arranged between an annular groove formed on an upper face of the sliding member and an inner wall of the housing.

The sliding member is substantially cylindrical and its outside diameter is larger than the inner diameter of the opening. An outer peripheral surface of the sliding member slidingly engages with an inner peripheral surface of the guide member. The guide member is comprised of a substantially cylindrical member having a first cut-out, through which the light passes along the predetermined optical path, and a second cut-out through which the cam member projects from the outer periphery of the guide member.

Alternatively, the sliding member may include at least two sliding portions which slide along guide rails provided in the housing. The sliding portions may be arranged in the sliding member in a manner to be diametrically opposed to each other.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

The present invention will be described with reference to the accompanying drawings of the preferred embodiment of the invention.

Figure 1:
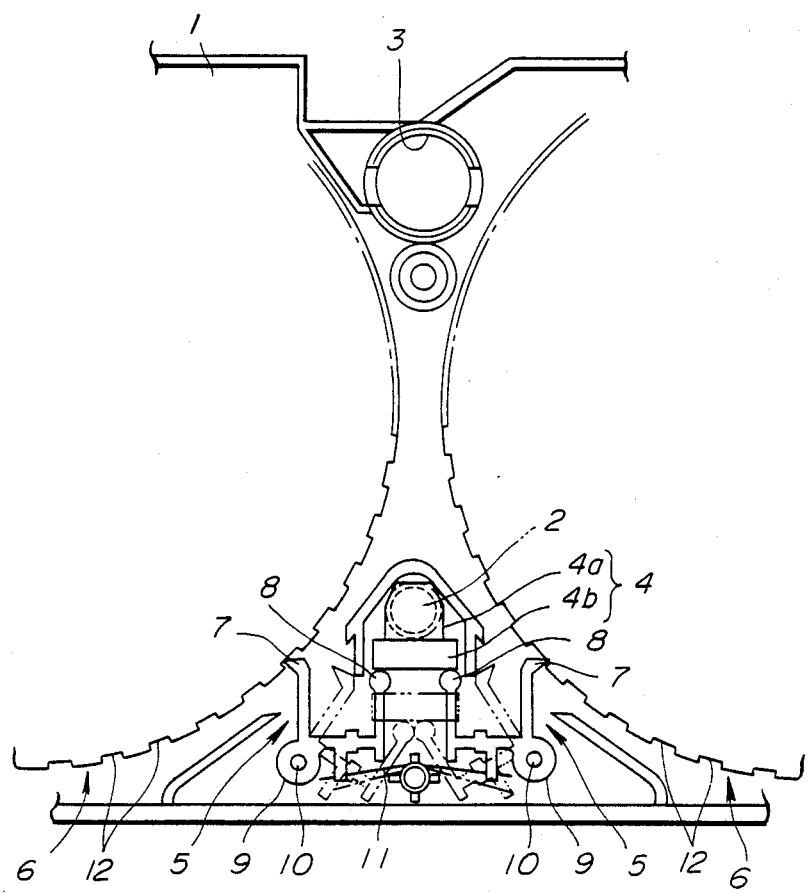
FIG. 1 is an enlarged plan view illustrating a reel lock mechanism of a prior art magnetic tape cassette.
Figure 2:
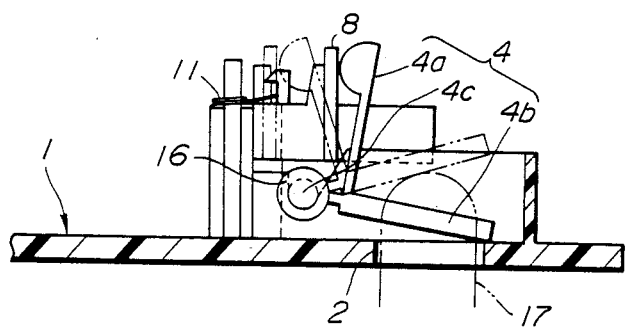
FIG. 2 is an enlarged cross-sectional view showing the movement of a lock releasing member of the prior art reel lock mechanism as shown in FIG. 1.
Figure 3:
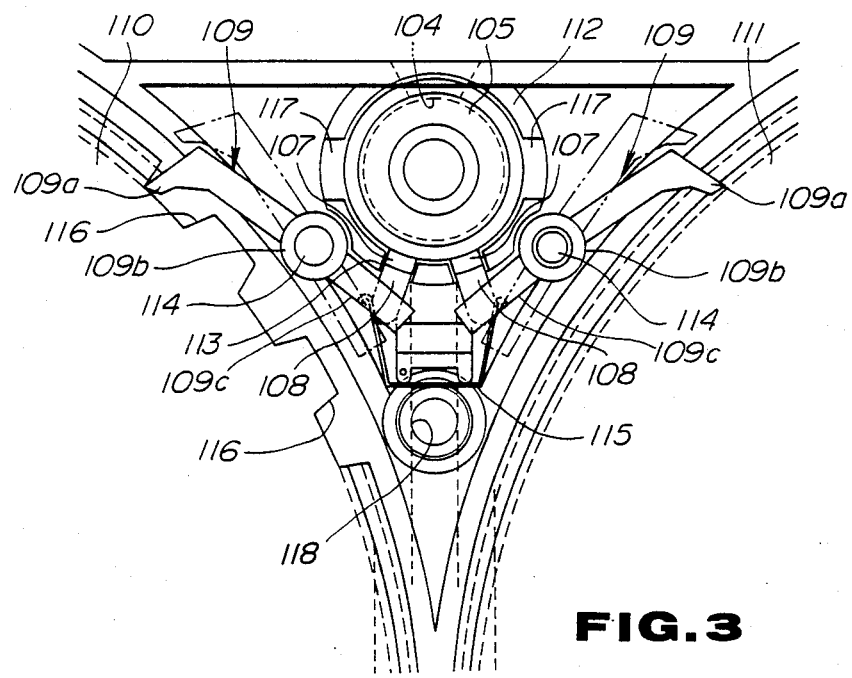
FIG. 3 is an enlarged plan view showing the reel lock mechanism of the magnetic tape cassette of the first embodiment according to the invention.
Figure 4:
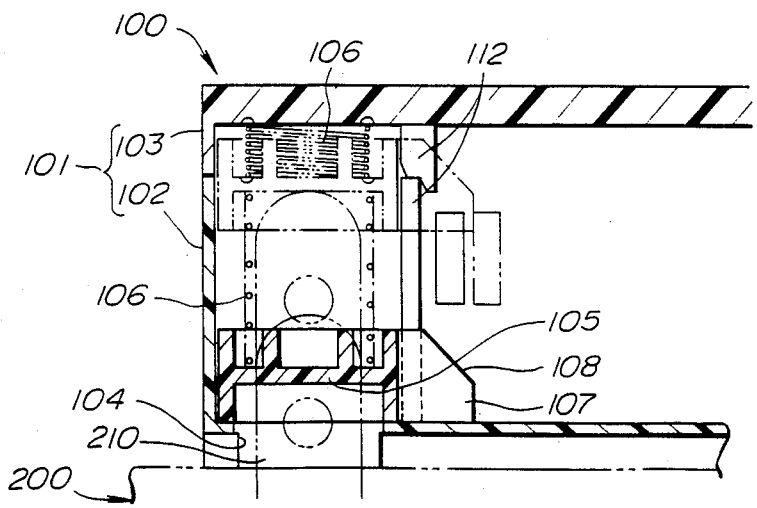
FIG. 4 is an enlarged cross-sectional view showing the essential parts of the reel lock mechanism of the magnetic tape cassette of the first embodiment.
Figure 5:
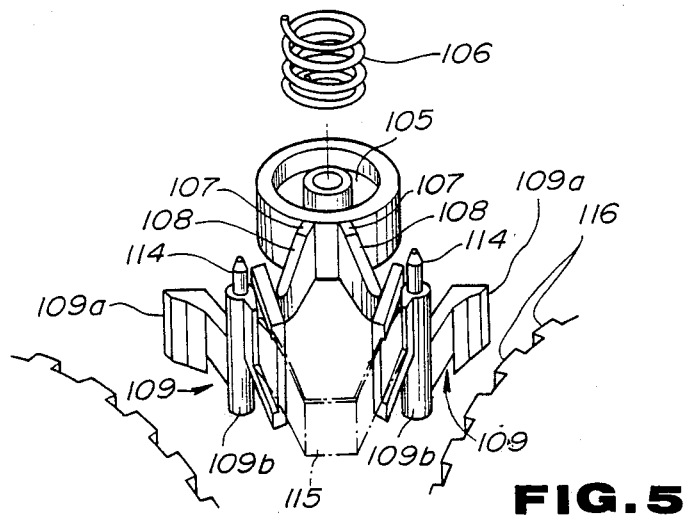
FIG. 5 is an enlarged perspective view showing the reel lock mechanism of the first embodiment as shown in FIGS. 3 and 4.

Referring now to the drawings, FIGS. 3, 4 and 5 represent a tape cassette 100 of the first embodiment according to the invention which is formed with a substantially rectangular cassette housing 101 and a pair of tape reels 110 and 111. The cassette housing 101 comprises upper and lower halfs 103 and 102. An opening 104, through which a light emitting portion 210 of a tape end detector (not shown) is inserted when the tape cassette 100 is inserted into a recording and/or reproducing apparatus 200, is formed on the bottom surface of the lower housing 102. The light emitting portion 210 is provided in the apparatus 200 so as to emit light towards the surface of tape. The light is transmitted through the transparent leader portions at the respective ends of tape onto a tape end detector provided in the apparatus 200. In this manner, the tape end is detected.

The opening 104 is closed by a sliding member 105 when the tape cassette 100 is out of the apparatus 200. The sliding member 105 is slidably supported by a substantially cylindrical guide member 112 which is formed on inner walls of the upper and lower housing halfs 103 and 102. The sliding member 105 is normally biased towards the inner surface of the lower housing 102 by a coil spring 106 as shown in FIG. 4. The coil spring 106 is arranged between an annular groove formed on the upper portion of the sliding member 105 and the inner wall of the upper housing 103. When the tape cassette 100 is inserted in the apparatus 200, the sliding member 105 is pushed up by the upper end of the light source portion 210 and as a result the sliding member 105 slides in the upper direction along the guide member 112.

As shown clearly in FIG. 3, a pair of reel lock mechanisms are symmetrically arranged in the cassette casing 101. The sliding member 105 includes two tab portions 107 each having a cam surface 108. The pair of tab portions 107 projects through a pair of cut-outs 113 in the guide portion 112. The two cam surfaces 108 abut with a pair of flat cam follower portions 109c each of which is rigidly connected to a cylindrical portion 109b of a reel lock arm 109. The reel lock arm 109 comprises a pawl portion 109a, the cylindrical portion 109b, and the flat portion 109c. The pair of reel lock arms 109 are respectively arranged so as to engage with teeth 116 which are formed on the outer peripheries of the supply reel 110 and the take-up reel 111. The cylindrical portion 109b is rotatably supported by a pin 114 which projects vertically from the inner surface of the lower housing 102. The pair of flat portions 109c is biased by a leaf spring 115 in such a manner that the pair of pawl portions 109a normally engage with teeth 116. The leaf spring 115 is supported by a cylindrical connecting member having a screw hole which receives a screw by which the upper and lower housings are connected. Reference numeral 117 denotes a notch for transmitting a light emitted from the optical source 210.

In this construction according to the invention, when the sliding member is pushed up by the end of the optical source portion 210 and slides in the upper direction, the cam surfaces 108 push the flat portions 109c, respectively and thereby rotate the right-hand reel lock arm counterclockwise and rotate the left-hand reel lock arm clockwise. This releases the engagement between the pair of pawl portions and the teeth 116 as shown by the phantom lines of FIG. 3.

In this manner, the reel lock mechanism is released by the insertion of the light source portion 210 into the opening 104. Further, the opening is normally closed by the sliding member 105 which serves as a cover to prevent dust from entering the housing.

Figure 6:
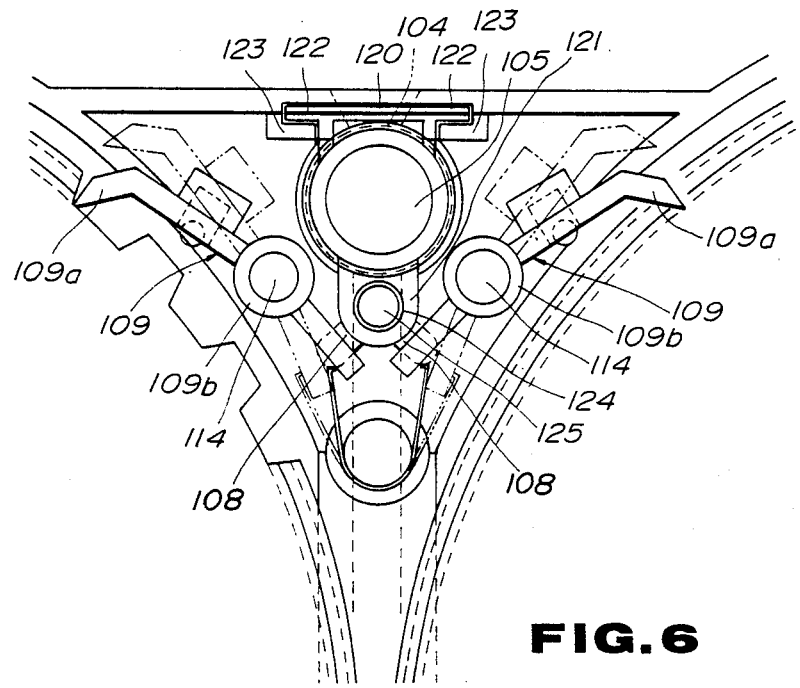
FIG. 6 is an enlarged plan view showing the reel lock mechanism of the second embodiment according to the invention.
Figure 7:
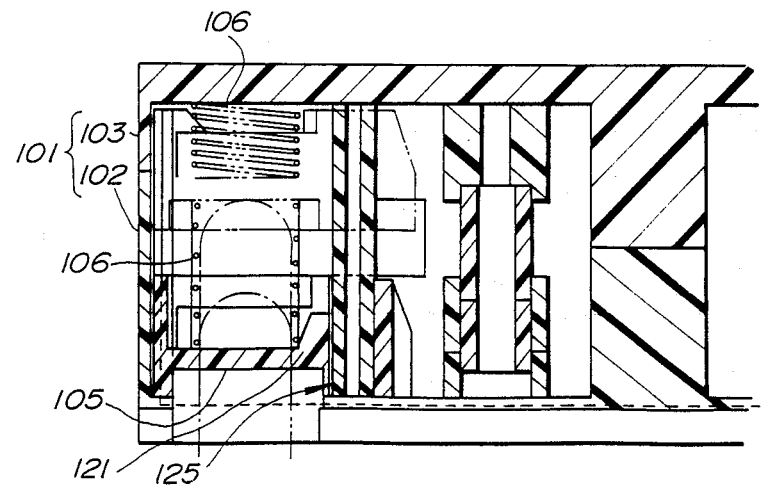
FIG. 7 is an enlarged cross-sectional view showing the essential parts of the reel lock mechanism of the magnetic tape cassette of the second embodiment.
Figure 8:
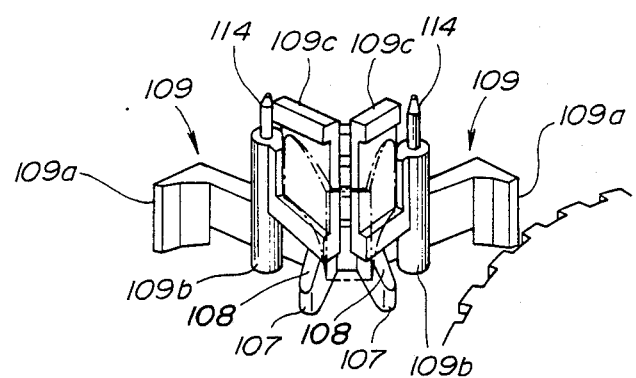
FIG. 8 is an enlarged perspective view showing the reel lock mechanism of the second embodiment according to the invention.

FIGS. 6, 7, and 8 show a magnetic tape cassette of a second embodiment according to the invention. In the second embodiment, the reference numerals used in the first embodiment denote elements.

As clearly seen in FIG. 6, the construction of a sliding member 105 of the second embodiment is different from that of the first embodiment.

In the second embodiment, the sliding member 105 is arranged in a manner to normally cover the opening 104 of the lower housing 102. The reel lock mechanism of the second embodiment is also symmetrical. The sliding member 105 includes a flat sliding portion 120 and a substantially cylindrical sliding portion 121. The flat sliding portion 120 has a pair of engaging portions 122 each of which engages a groove of a guide rail 123. The cylindrical sliding portion 121 has a internal surface 124 which slidably engages a guide pin 125. In this construction, the sliding member 105 is slidable along the guide rail 123 and the guide pin 125. The sliding member 105 is biased towards the inner surface of the lower housing 102 by the spring 106.

Thus, in the second embodiment, the sliding member differs from the first embodiment only in the manner in which it is slidably supported within the casing. Therefore, light from the light source portion 210 passes through a space between the guide rail 123 and the guide pin 125.

As will be appreciated from the above, the locking mechanism for a tape, cassette of the disclosed embodiments is arranged so as to prevent the entry of dust into the casing. Furthermore, the magnetic tape cassette of the invention includes a compact reel lock mechanism in which a pair of reel lock arms are released by the insertion of an a light source element into an opening formed in the bottom wall of the cassette casing.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A magnetic tape cassette comprising:
   a pair of tape reels each being rotatable about its axis for receiving a tape;
   a housing defining a space for enclosing said pair of reels;
   a pair of reel lock arms pivotably arranged in the housing for engaging with the peripheries of said reels and restricting rotation of said reels;
   first spring means for establishing engagement between said reel lock arms and the peripheries of said reels;
   an opening formed in a bottom face of said housing through which a tape end detecting element can be introduced;
   a sliding member arranged in said housing for covering said opening, said sliding member sliding along a predetermined path;
   a pair of cam members provided on said sliding member for rotating said reel lock arms to release engagement between said reel lock arms and the peripheries of said reels when said tape end detecting element is inserted into said opening;
   a guide member for defining the predetermined path of said sliding member and for defining a predetermined optical path along which light emitted by said detecting element can pass; and
   second spring means biasing said sliding member towards a bottom position in which said opening is closed by said sliding member.

2. A magnetic tape cassette as set forth in claim 1, wherein said second spring means is comprised of a coil spring.

3. A magnetic tape cassette as set forth in claim 2, wherein said second spring means is arranged between an annular groove formed on an upper face of said sliding member and an inner wall of said housing.

4. A magnetic tape cassette as set forth in claim 3, wherein said sliding member is substantially cylindrical and its outside diameter is larger than an inner diameter of said opening.

5. A magnetic tape cassette as set forth in claim 4, wherein an outer peripheral surface of said sliding member slidingly engages with an inner peripheral surface of said guide member.

6. A magnetic tape cassette as set forth in claim 5, wherein said guide member is comprised of a substantially cylindrical member having a first cut-out, through which said light passes along said predetermined optical path, and a second cut-out through which said cam member projects from the outer periphery of said guide member.

7. A magnetic tape cassette as set forth in claim 4, wherein said sliding member includes at least two sliding portions which slide along guide rails provided in said housing.

8. A magnetic tape cassette as set forth in claim 7, wherein said sliding portions are arranged in said sliding member in a manner to be diametrically opposed to each other.

* * * * *